United States Patent [19]

Heuser

[11] Patent Number: 4,473,174

[45] Date of Patent: Sep. 25, 1984

[54] WINE PRESERVER AND DISPENSER

[75] Inventor: Rudolph L. Heuser, Calistoga, Calif.

[73] Assignee: Howard John Cream, Calistoga, Calif.

[21] Appl. No.: 403,293

[22] Filed: Jul. 30, 1982

[51] Int. Cl.³ .............................................. B65D 83/14
[52] U.S. Cl. ........................................ 222/152; 222/5; 222/80; 222/399; 215/311; 426/394; 426/397
[58] Field of Search ..................................... 222/80–82, 222/88, 152, 190, 372, 380, 394, 399, 400.7, 401, 3–5; 426/394, 397, 404; 215/311, 315, 228, 3, 4; 99/323.1, 323.2; 137/625.48

[56] References Cited

U.S. PATENT DOCUMENTS

| | | | |
|---|---|---|---|
| 2,060,512 | 11/1936 | Magill | 222/401 |
| 2,208,490 | 7/1940 | Axtell et al. | 222/399 X |
| 2,921,711 | 1/1960 | Mack | 222/399 X |
| 3,315,844 | 4/1967 | Klasson et al. | 222/399 X |
| 3,883,043 | 5/1975 | Lane | 222/474 X |
| 4,011,971 | 3/1977 | Haydon | 222/399 |
| 4,392,578 | 7/1983 | Fipp et al. | 222/152 X |

Primary Examiner—Joseph J. Rolla
Assistant Examiner—Kevin P. Shaver
Attorney, Agent, or Firm—Christie, Parker & Hale

[57] ABSTRACT

There is described apparatus for protecting and dispensing wine from a bottle in which a stopper assembly inserted in the neck of the bottle receives a removable cap assembly. The cap includes a chamber receiving gas under pressure from a cartridge stored in the cap. A valve in the stopper has three positions, an off position, a bottle venting position, and a bottle pressurizing position. In the latter position, gas under pressure stored in the cap is directed into the bottle so as to insert an inert gas into the bottle. In the vent position, excess pressure in the top of the bottle can be relieved. A second valve in the stopper controls an output spigot from which wine is dispensed from the bottle.

13 Claims, 4 Drawing Figures

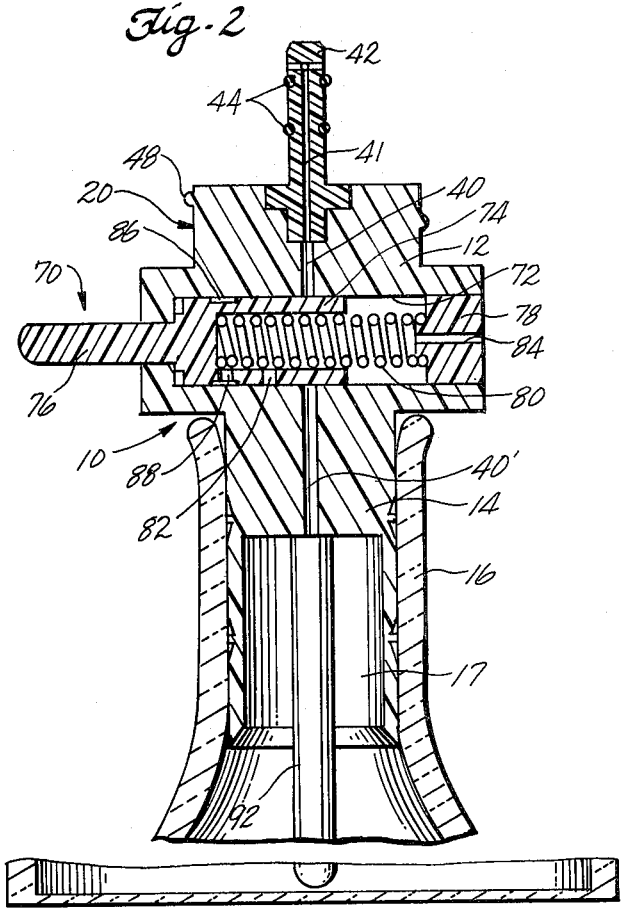
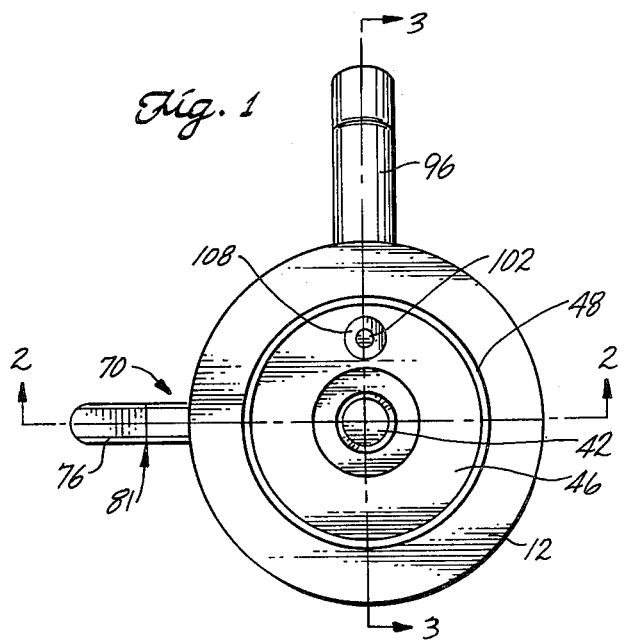

WINE PRESERVER AND DISPENSER

FIELD OF THE INVENTION

This invention relates to a stopper for wine bottles and, more particularly, to a stopper which allows the air in the bottle to be replaced by an inert gas in the top of the bottle.

BACKGROUND OF THE INVENTION

It is well-known that once a bottle of wine is open to the air, the quality of the wine begins to deteriorate. In order to preserve the unused portion of the wine in the bottle once it is opened, it is desirable to replace the air above the surface of the wine with an inert gas such as carbon dioxide. Various devices have heretofore been proposed which can be attached to the wine bottle and used to fill the bottle above the wine with an inert gas from a pressurized cartridge. See, for example, U.S. Pat. Nos. 3,883,043 and 4,011,971. Both of these patents show devices having a hollow needle or thin tube which is inserted through the bottle cork into the interior of the bottle through which the wine can be withdrawn from the bottle and through which an inert gas can be directed into the space in the bottle above the surface of the wine. This hollow needle requires two passages and a complicated valve arrangement to control the pressurizing of the bottle and the dispensing of the wine. Such known devices have been bulky and difficult to use and are relatively expensive. In at least one of the known prior art arrangements, the bottle must be tilted to let the wine flow to the stopper end of the bottle in order to dispense the wine.

SUMMARY OF THE INVENTION

The present invention is directed to an improved stopper arrangement for preserving the flavor of the wine once the bottle is opened and for allowing easy dispensing of the wine from the bottle without the necessity of tilting the bottle. An inert gas, such as carbon dioxide, from a pressurized cartridge is used to purge the air from the top of the opened wine bottle and to pressurize the wine sufficiently to cause it to flow out of the top of the bottle without tilting the bottle. A simple valve arrangement allows the air to be purged with very little gas, using finger tip control. The pressurized gas is contained in a removable and replaceable cap which can be screwed to the stopper. A safety arrangement allows the cap only to be removed when the pressure has been relieved. Twisting the cap allows the gas to be used to force the wine up through a spigot attached to the stopper.

These and other advantages of the present invention are provided by a stopper assembly including a valve body and a stopper portion projecting from the valve body which is adapted to be inserted into the open mouth of a wine bottle or the like. A cap assembly is removably secured to the valve body and in combination with the valve body forms a sealed chamber in the cap which is pressurized with an inert gas from a gas cartridge inserted in the chamber. A three-position purging valve is movable between a closed position and an intermediate position in which a passage through the stopper vents the air space above the wine in the top of the bottle to the atmosphere. The valve in a third position directs gas under pressure from the chamber in the cap through the same passage in the stopper into the space above the wine for filling the space with an inert gas. Rotation of the cap controls a dispensing valve which directs wine from the bottle through a spigot in the stopper assembly.

DESCRIPTION OF THE DRAWINGS

For a better understanding of the invention, reference should be made to the accompanying drawings, wherein:

FIG. 1 is a top view of the valve body of the stopper assembly;

FIG. 2 is a sectional view taken substantially on the line 2—2 of FIG. 1;

DETAILED DESCRIPTION

Figure 3:
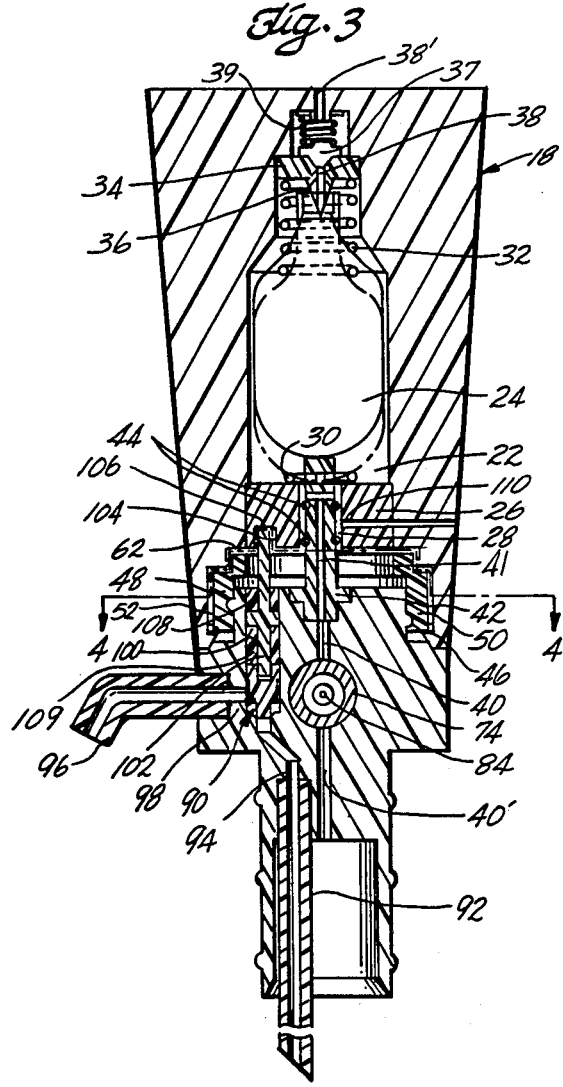
FIG. 3 is a sectional view taken substantially on the line 3—3 of FIG. 1 but showing the pressurized cap mounted on top of the valve body of the stopper assembly.

Referring to the drawings in detail, the numeral 10 indicates generally a stopper assembly including a valve body 12 and a stopper portion 14. The stopper portion 14 is adapted to be inserted into the neck 16 of a wine bottle or other container of a liquid to be dispensed and is recessed, as indicated at 17, so that the stopper flexes and seals against the inside of the bottle. A removable cap assembly 18 is screwed onto the top of the stopper assembly by a safety coupling, indicated generally at 20, that prevents inadvertent removal of the cap assembly when the system is pressurized and allows the cap to be twisted to open a dispensing valve.

The cap assembly 18 has a chamber 22 which receives a pressurized cartridge 24 containing liquified $CO_2$. The cartridge 24 may be a standard commercially available carbon dioxide cartridge which is used in seltzer water dispensers and the like. The cartridge is inserted into the chamber 22 through the safety coupling 20 while the cap is removed from the stopper assembly, and is held in place in the chamber by a removable plug 26 having a central bore 28.

The cartridge is held in place against an annular notched seat 30 on top of the plug 26 by a compression spring 32 at the upper end of the chamber 22. A hardened steel valve seat 34 positioned in the top of the chamber 22 has a sharp piercing element 36 pointed at the top of the cartridge 24. When the cartridge 24 is pushed up in the chamber 22, in a manner hereinafter described, the piercing element 36 punctures the soft metal seal in the top of the cartridge 24, releasing gas from the cartridge into the chamber 22. A safety relief valve 37 prevents excessive pressure in the chamber 22 by releasing gas through a passage 38, 38' when the pressure is greater than the pressure exerted by a safety spring 39.

Gas is directed into the top of the wine bottle through a passage 40, 40' in the valve body 12. The upper portion 40 connects with a passage 41 which extends through the center of a post 42 in the top of the valve body which projects into the bore 28 of the plug 26 when the cap assembly 18 is secured to the top of the stopper. A pair of 0-rings 44 in the post form a seal with the walls of the bore 28 to prevent escape of gas from the chamber 22. Passage 41, because of its small diameters, also produces a significant dynamic gas pressure reduction between chamber 22 and outlet of the passage 40' when the passages are open through the valve body.

Figure 4:
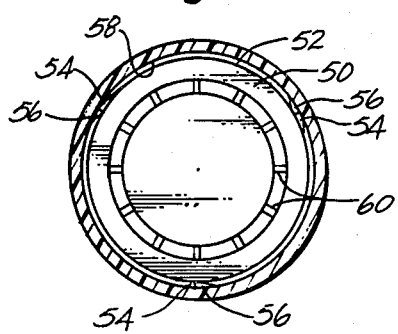
FIG. 4 is a cross-sectional view taken on the line 4—4 of FIG. 3.

The cap is threaded onto the top of the valve housing 12 by the threaded safety coupling 20. The coupling 20 includes a male threaded portion 46 integral with and projecting above the top of the valve housing having a spiral thread 48 extending around the periphery. The male threaded portion 46 of the valve housing is engaged by a mating threaded collar 50 which is rotatable in a recess in the end of the cap assembly 18. The collar 50 has an outside cylindrical surface 52 having one or more projecting teeth 54, as seen in FIG. 4. These teeth engage with mating teeth 56 projecting from the surface 58 forming the wall of the recess in the end of the cap assembly 18. Rotation of the cap in a clockwise direction, as viewed in FIG. 4, causes the two groups of teeth to engage to produce rotation of the collar 50 for tightening the collar onto the threaded projection 46 and securing the cap assembly 18 in place. However, rotation of the cap in the opposite direction allows the projecting sets of teeth 54 and 56 to slide past each other because of the tapered shape of the teeth. Thus rotation of the cap in a counterclockwise direction does not impart any significant torque to the collar 50. In order to loosen the collar 50, it is necessary to press downwardly on the cap assembly 18, causing a plurality of radially extending ridges 60 on the top of the collar to engage a similar group of ridges 62 on the mating surface of the cap assembly 18. This coupling arrangement for securing the cap assembly 18 to the stopper assembly is substantially identical to the conventional safety cap found on various types of containers, such as aspirin bottles and the like. It has the advantage that it allows the cap to be rotated relative to the stopper assembly without loosening the cap assembly coupling. This prevents the inadvertent loosening of the cap assembly, which could be dangerous once the system is pressurized, and permits the cap assembly to be rotated to control a dispensing valve to permit the flow of wine from the bottle through a spigot in a manner hereinafter described in detail.

When the cap assembly 18 is mounted on the stopper assembly, the post 42 is first inserted into the bore 28 of the plug 26. The upper end of the post engages the cartridge 24 as the cap assembly is tightened down by threading the coupling collar 50 onto the projecting portion 46 of the valve body 12. As the cap is screwed down onto the valve body, the cartridge 24 is pushed upwardly against the spring 32, causing the gas seal to be punctured by the piercing element 36, releasing gas into the chamber 22. The gas is directed by the passages 40, 41 in the valve body into a three-position purging valve, indicated generally at 70. The valve includes a transverse bore in the valve body 12 for receiving a sliding valve element 74. The valve slide includes a plunger or knob 76 which projects outside the valve housing 12 for actuating the valve. The valve slide 74 is retained in the bore by a valve plug 78 and compression spring 80.

In the position shown in FIG. 2, the valve slide element 74 is in the "off" position, cutting off the flow of gas through the upper portion of the passage 40 into the lower portion of the passage 40'. When the valve slide element is depressed to an intermediate position marked by an index line 81 on plunger 76, a port 82 is aligned with the lower passage portion 40', opening the interior of the wine bottle to an outside vent 84 extending through the plug 78. When fully depressed, the valve slide element 74 connects the upper portion 40 of the passage to the lower portion 40' through an annular recess 86 on the outside of the slide element which is aligned with the passage 40, 40'. A port 88 in the slide element also connects gas under pressure to the vent 84 from the annular recess 86. The plunger preferably has a flat surface along one side which, in combination with a flat side in the valve body opening through which the plunger extends, prevents rotation of the valve slide. This insures alignment between the port 82 and passage 40'.

In addition to the purging valve described above, there is provided a dispensing valve, indicated generally at 90, in the valve body 12. A dispensing tube 92 extends down into the liquid in the bottle from the stopper assembly. The upper end of the tube 92 communicates with a passage 94 in the stopper assembly, the passage 94 communicating with the valve assembly 90. The valve 90, when open, operates to direct liquid entering the tube 92 to an outlet spigot 96.

The valve 90 is a simple metering valve having a slide element 98 received in a bore 100 in the valve body 12. The passage 94 enters the lower end of the bore and flow is controlled by adjusting the vertical position of the slide element 98. When lowered, the slide element seats against the bottom of the bore and shuts off the flow of liquid from the passage 94. The position of the slide element 98 is controlled by a dispensing valve positioning pin 102 which extends out of the top of the valve body 12 and into contact with the plug 26 in the cap assembly 18. The pin 102 extends into an annular channel or groove 104 in the end of the plug 26. The bottom surface 106 of the groove 104 is sloped so that as the plug 26 rotates relative to the pin 102, the pin changes the vertical position of the valve slide 98 to open and close the dispensing valve 90. An annular valve plug 108 retains the pin 102 in the bore 100. A compression bushing 109 normally urges the slide element 98 downwardly into the seat. In the position shown in FIG. 3, gas pressure in the bottle above the surface of the wine causes the wine to flow up the dispensing tube 92 and passage 94 to urge slide element 98 upwards, opening dispensing valve 90, and further causing the wine to flow out of spigot 96.

While the operation of the invention is believed evident from the above description of the apparatus, the following description of the operation is given by way of summary. The cap assembly and the stopper assembly are initially assembled by placing the stopper in an empty bottle, for example, or other convenient means of holding the stopper assembly. The cap assembly is then placed on top of the stopper assembly with the post 42 projecting into the bore in the plug 26 of the cap assembly. The threaded coupling is then screwed on to the stopper assembly by rotating the cap in a clockwise directions until it can no longer be turned. In the process, the post pushes the cartridge 24 against the piercing point 36, releasing the gas from the cartridge to activate the unit. The release of gas from the cartridge can be verified by momentarily depressing the purging valve plunger 76 and allowing gas to escape through the vent 84.

When a new bottle of wine is opened, the assembled unit can then be inserted into the neck of the bottle immediately after the cork is removed. With the cap rotated to the position in which the dispensing valve 90 is fully closed, the neck of the bottle is grasped with the thumb on the purge valve plunger 76 and with the index finger covering the vent passage 84. The purge valve plunger is then fully depressed with the thumb. As soon as the gas begins to flow into the wine bottle, the index finger is alternately removed and returned to cover the vent hole. This is repeated rapidly about four or five times so that the interior of the bottle is alternately pressurized and vented. This action results in a series of low pressure surges that facilitate purging of air from the space in the bottle above the wine and replacing the air with inert gas.

To dispense wine from the bottle, the cap is rotated to a position in which the dispensing valve 90 is fully opened. The purge valve plunger is then fully depressed with the index finger covering the vent. This causes gas under pressure to enter the top of the bottle, pushing the wine out through the tube 92 and valve 90 to the spigot 96.

When the wine is fully consumed, the unit can be removed and inserted into another bottle. Thus the unit can be used over and over until the cartridge is completely depleted of pressurized gas. With the pressure dissipated, the cap assembly can be removed from the stopper assembly by pressing down on the cap while at the same time rotating it counterclockwise to unscrew the coupling. A vent opening 110 in the bore 28 may be provided in the cap assembly to bleed off any pressure remaining in the chamber 22 before the coupling becomes completely disengaged with the stopper assembly. The cartridge 24 can be replaced with a new cartridge by removing the plug 26 from the cap assembly 18.

From the above description it will be seen that a self-contained pressurized stopper arrangement is provided which serves to preserve the wine in the bottle and dispense the wine without tilting the bottle. The unit is activated by a standard $CO_2$ cartridge which provides the air purging gas for preserving the wine quality and also energizing the dispensing system.

1. Apparatus for protecting wine in an opened bottle comprising: a stopper assembly, a cap assembly detachably mounted on the stopper assembly, the cap assembly in combination with the stopper assembly forming a sealed enclosed chamber for receiving a compressed gas cartridge, means projecting into the chamber for automatically puncturing a cartridge in the chamber to release gas under pressure into the sealed chamber when the cap assembly is attached to the stopper assembly, the stopper assembly having a portion adapted to be inserted in the open neck of a wine bottle, the stopper assembly having a first passage opening into the chamber, a second passage opening into the inside of the bottle and a third passage opening to the outside of the bottle, three position valve means for interconnecting said passages, the valve means in a first position shutting off all three passages, the valve means in a second position shutting off the passage to said chamber and connecting the passage to the inside of the bottle to the passage to the outside of the bottle for venting the inside of the bottle, the valve means in the third position connecting all three passages together, and means for manually activating the valve means to move the valve means to any of said three positions.

2. Apparatus of claim 1 wherein said third passage is aligned with the actuator and opens on the opposite side of the stopper assembly from the actuator, whereby the opening of the third passage can be covered by a user's finger while the user's thumb is operating the actuator to position the valve.

3. Apparatus of claim 1 further including a spring loaded relief valve in the cap assembly.

4. Apparatus for protecting and dispensing liquid in a bottle or the like, comprising:

a stopper assembly including valve body and stopper portion projecting from the body adapted to be inserted in the open mouth of the bottle, a cap assembly removably secured to the stopper assembly and forming a sealed chamber, means for pressurizing the chamber with an inert gas, the valve body having a passage extending from the chamber through the stopper portion of the stopper assembly for directing gas from the chamber to the interior of the bottle, and purging valve means positioned in the valve body of the stopper assembly, the purging valve means being movable between three positions, the valve means in a first position blocking flow of gas through the passage between the chamber and the interior of the bottle, the valve means in a second position blocking flow of gas from the chamber but connecting a vent opening to the interior of the bottle, the valve means in a third position connecting the passage from the chamber to the interior of the bottle and connecting the interior of the bottle to the vent opening.

5. Apparatus of claim 4 wherein the purging valve means includes a movable element positioned in a bore in the valve body, an actuator means connected to the movable element and extending outside the valve body for manually moving the movable element between said three positions, and spring means for returning the movable element to the first position.

6. The apparatus of claim 4 including means for reducing the pressure of the gas between the chamber and the purging valve means.

7. Apparatus of claim 6 wherein said valve means includes a slide element movable to said three positions, a spring urging the slide element to said first position, and actuator means extending outside the stopper assembly for moving the slide element against the urging of the spring successively to the second position and the third position.

8. Apparatus of claim 4 further including a pressurized gas cartridge mounted in said chamber, and means for opening the cartridge to release gas into the chamber when the cap assembly is secured to the stopper assembly.

9. Apparatus of claim 8 further including threaded screw coupling means for securing the cap assembly to the stopper assembly.

10. Apparatus of claim 9 further including post means projecting from the stopper assembly into the chamber of the cap assembly when the cap assembly is screwed onto the stopper assembly, the post means engaging the gas cartridge, and means actuated by the post means for piercing the cartridge to release gas from the cartridge into the chamber as the cap assembly is screwed onto the stopper assembly.

11. Apparatus of claim 4 wherein the stopper assembly includes spigot means, a tube extending into the liquid, and a dispensing valve connecting the tube to the spigot means for dispensing liquid from the bottle when the dispensing valve is open, and the liquid is pressurized by setting the purging valve in said third position and closing off said vent.

12. Apparatus of claim 11 further including means actuated by rotation of the cap assembly for opening and closing the dispensing valve.

13. Apparatus of claim 12 wherein the purging valve means includes a movable element positioned in a bore in the valve body, an actuator means connected to the movable element and extending outside the valve body for manually moving the movable element between said three positions, and spring means for returning the movable element to the first position.

* * * * *